United States Patent

[11] 3,557,937

[72] Inventor Norman D. Kahre
Hoyleton, Ill.
[21] Appl. No. 768,754
[22] Filed Oct. 18, 1968
[45] Patented Jan. 26, 1971
[73] Assignee National Mine Service Company
Pittsburgh, Pa.
a corporation of West Virginia

[54] TENSIONING APPARATUS FOR AN ENDLESS CONVEYOR
9 Claims, 3 Drawing Figs.

[52] U.S. Cl. ................................................... 198/109
[51] Int. Cl. ............................................ B65g 41/00
[50] Field of Search ........................................ 198/109;
208

[56] References Cited
UNITED STATES PATENTS
2,613,800  10/1952  Merck ......................... 198/109
2,690,834  10/1954  Lundquist ..................... 198/208

*Primary Examiner*—Richard E. Aegerter
*Attorney*—Stanley J. Price, Jr.

ABSTRACT: This disclosure relates to an endless conveyor that includes a fixed frame and a laterally swingable end frame. The end frame pivots about a first vertical pivot axis and has a longitudinally movable bracket carrying a drive sprocket and a drive shaft adjacent the material discharge end. A push rod is pivotally connected to the fixed frame at a second vertical pivot axis spaced forwardly from the first vertical pivot axis. The other end of the push rod is connected to the movable bracket so that lateral movement of the end frame moves the bracket member longitudinally in the end frame toward the discharge end to exert a tension on an endless conveyor positioned in the frames and reeved about the drive sprocket.

PATENTED JAN 26 1971
3,557,937
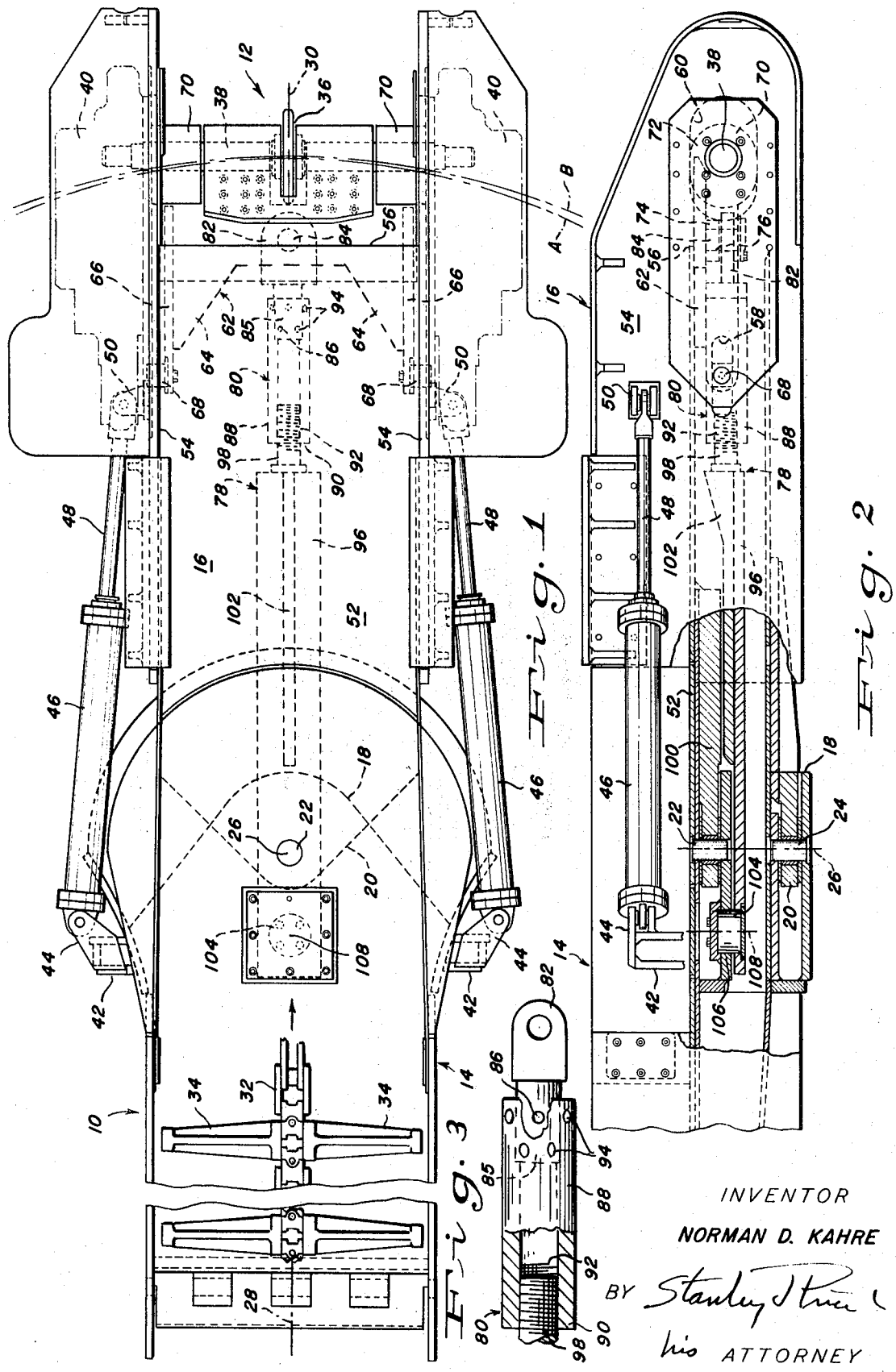
INVENTOR
NORMAN D. KAHRE
BY Stanley J Price
his ATTORNEY 3,557,937

TENSIONING APPARATUS FOR AN ENDLESS CONVEYOR

BACKGROUND OF THE INVENTION

1. Field of the Invention

This invention relates to endless conveyors and more particularly to an endless chain conveyor that has an end portion swingable laterally relative to a fixed portion.

2. Description of the Prior Art

Endless conveyors associated with mining machinery such as continuous miners or mobile loading machines have at least one end that can be swung laterally to position the discharge portion of the conveyor over a receiver positioned adjacent thereto. The conveyors have an endless chain with laterally extending flights positioned in troughlike frame members and reeved about an end sprocket. When the end portion of the conveyor is swung laterally from a position where the axes of the frame members are aligned, slack is introduced into the conveyor chain. It has been found, for proper operation of the conveyor, that the slack must be taken up in the chain to provide for proper tension of the conveyor. In the past, the slack takeup in the conveyor chain has been accomplished by resilient springs, cams, push rod devices and hydraulically controlled piston-cylinder tensioning devices. U.S. Pat. No. 2,856,061 discloses a typical hydraulic takeup device for an endless chain conveyor forming a part of a mobile loading machine. These takeup devices included actuating apparatus along the side of the conveyor that limited the space available for other equipment on the mining apparatus.

SUMMARY OF THE INVENTION

This invention relates to a pushrod-type takeup device that is positioned beneath the conveyor frame and has a pivot axis spaced forwardly from the pivot axis for the swingable end frame. The pushrod is secured to a longitudinally movable bracket in the end frame and is arranged to move the bracket longitudinally away from the pivot axis of the frame as the frame is moved laterally.

Accordingly, the principal object of this invention is to provide an endless chain-type conveyor having the chain-tensioning means positioned within the confines of the conveyor frame.

Another object of this invention is to provide an improved mechanical tensioning device for an endless chain-type conveyor when an end portion of the conveyor is swung laterally.

These and other objects and advantages of this invention will be more completely disclosed and described in the following specification, the accompanying drawings and the appended claims.

DESCRIPTION OF THE DRAWINGS

FIG. 1 is a top plan view of an end portion of an endless chain conveyor having a laterally swingable end portion.

FIG. 2 is a view in side elevation and partially in section illustrating the pushrod type tensioning apparatus for the endless chain conveyor.

FIG. 3 is a fragmentary view of the adjusting apparatus for the push rod.

DESCRIPTION OF THE PREFERRED EMBODIMENT

Referring to the drawings, there is illustrated an endless chain-type conveyor generally designated by the numeral 10 that forms a part of a continuous mining machine (not shown). The endless conveyor 10 is arranged to convey dislodged material from the front of the mining machine to the rear end of the mining machine where the dislodged material is discharged into a receiver such as a shuttle car or the like. The conveyor 10 on the continuous mining machine at times is not longitudinally aligned with the receiver and it is necessary to swing a portion of the conveyor 10 laterally to position the discharge end 12 over the receiver. Although the conveyor 10 is described for use with a continuous mining machine, it should be understood that the hereinafter described tensioning apparatus may be used with equal facility on other machines such as mobile loading machines and the like.

The endless conveyor 10 has a troughlike fixed frame 14 that is rigidly secured to the mining machine and a laterally swingable troughlike end frame 16. The fixed frame 14 has a rear end portion 18 and the end frame 16 has a front end portion 20 in overlying relation with end portion 18. As illustrated in FIG. 2, pivot pins 22 and 24 extend through receiving apertures in the rear and front end portions 18 and 20 of frames 14 and 16 respectively to provide a vertical pivot axis 26 for the rear frame member 16. The frame members 14 and 16 each have a central longitudinal axis designated by the numerals 28 and 30 respectively which pass through the pivot axis 26 as viewed in FIG. 1.

An endless chain 32, a portion of which is illustrated in FIG. 1, has laterally extending conveyor flights 34 that are arranged to convey the dislodge material rearwardly on the conveyor 10. The endless chain 32 is reeved about a drive sprocket 36 that is mounted on a transverse drive shaft 38 and driven by drive motors 40. With this arrangement the sprocket 36 pulls the chain 32 to move the transverse conveyor flights 34 longitudinally along the troughlike sections of the frames 14 and 16 to convey the material longitudinally along the frames 14 and 16 and discharge the material from the discharge end 12.

The main frame 14 has brackets 42 extending laterally from the sidewalls and supporting actuator brackets 44. Cylinders 46 are pivotally secured at one end to the brackets 44 and have piston rods 48 extending forwardly therefrom. The front end of the piston rods 48 are pivotally secured to respective brackets 50 extending laterally from the sidewalls of the movable end frame 16. With this arrangement, the rods 48 may be alternatively extended and retracted in the cylinders 46 to thereby pivot the conveyor end frame 16 about the pivot axis 26 and thus swing the end frame 16 laterally relative to the longitudinal axis 28 of the fixed frame 14.

The end frame 16 has a bottom wall or floor portion 52 and vertical sidewalls 54. The bottom wall 52 terminates at a rear edge 56 and the sidewalls 54 from side boards that extend longitudinally beyond the bottom wall rear edge 56. The sidewalls 54 each have first elongated aligned apertures 58 and second aligned enlarged elongated apertures 60. A bracket member 62 is positioned beneath the bottom wall or floor 52 and has forwardly extending portions 64 that are secured to vertical members 66 positioned adjacent the side boards of sidewalls 54. Rollers 68 are mounted on the vertical members 66 and extend laterally through the elongated apertures 58 to provide longitudinal movement of the bracket 62 relative to the end frame 16. The bracket 62 has journals 70 formed thereon with portions 72 extending through the elongated apertures 60 in side boards 54 to movably support the bracket 62 in the side boards 54. The drive shaft 38 is rotatably positioned in the journals 70 and suitably connected to the drive motors 40. The sprocket 36 is nonrotatably secured to the drive shaft 38 and rotates therewith. With this arrangement the drive shaft 38 and drive motors 40 are suitably connected to the bracket 62 and the bracket 62 is arranged to move longitudinally relative to the end frame 16.

The bracket 62 has a forwardly extending receiver 74 (FIG. 2) with vertical pin apertures 76 therethrough A pushrod generally designated by the numeral 78 has a rear end portion generally designated by the numeral 80 that has a tongue portion 82 extending into the bracket receiver 74. A pin 84 extends through an aligned aperture in the tongue 82 and the apertures 76 to provide a rear pivot connection for connecting the pushrod 78 to the bracket 62. The tongue 82 has a cylindrical front end portion 85h transverse passageways 86 therethrough. A sleeve 88 (FIG. 3) has a front end portion 90 with an internally threaded portion 92. The rear portion of the sleeve 80 has a plurality of peripheral passages 94 adjacent the rear end portion which are arranged to be aligned with the transverse passageways 86 in the tongue front end portion 85.

A pushrod takeup bar 96 has a cylindrical threaded end portion 98 that is positioned in and threadedly secured within the threaded portion 92 of sleeve 88. The threaded connection between the sleeve 88 and the cylindrical threaded end portion 98 is operable to adjust the tension of the endless chain 32 when the conveyor end frame 16 is aligned longitudinally with the fixed frame 14. A guide member 100 is secured to the underside of the end frame bottom wall 52 and has a longitudinal slot extending along the axis 30 of end frame 16. The pushrod bar 96 has an upwardly extending guide 102 positioned in the longitudinal passageway in member 100 to permit longitudinal reciprocal movement of the pushrod takeup bar 96 along the longitudinal axis of the rear frame 16. The push rod 96 has an upwardly extending pivot pin 104 adjacent the front end thereof that extends into a cylindrical receiver 106 secured to the floor or bottom wall of the fixed conveyor frame 14 at a location forwardly of the pivot axis 26. The pivot pin 104 thus provides a pivot axis 108 through which passes the longitudinal axis 28 of the fixed frame member 14. Thus the pushrod 78 is pivotally secured at one end to the base of the fixed frame 14 and is arranged to pivot about the pivot axis 108 and is pivotally secured at the other end to the bracket 62. The rear frame, however, is connected to the fixed frame 14 and arranged to pivot about the pivot axis 26 which is spaced longitudinally from the pivot axis 108. With this arrangement, as the rear frame 16 pivots laterally along an arc indicated by the letter A, the push rod pivots about the pivot pin 108 along the indicated by the letter B. The arc B is flatter than the arc A and the bracket 62 connected to push rod 78 follows arc B and moves longitudinally within the elongated apertures 58 and 60 to tension the endless chain 32. The distance between the arcs A and B, schematically illustrated in FIG. 1, moves the bracket 62 longitudinally to maintain the chain 32 in tension as the conveyor rear frame is swung laterally from the position illustrated in FIG. 1 to a lateral position on either side.

To provide the desired initial tension on the conveyor chain 32, the sleeve 88 is rotated to move longitudinally on the cylindrical threaded end portion 98 of the takeup bar and move the bracket longitudinally therewith. The threaded connection between the cylindrical threaded end portion 98 and the sleeve 88 provides for this controlled longitudinal movement. When the desired tension is obtained on the chain 32, pins are inserted through aligned passageways 94 and 86 in the sleeve 88 and in the tongue front end portion 85.

With the above arrangement there is provided a positive mechanical tensioning apparatus for the endless chain 32 that automatically exerts a tension on the chain 32 as the conveyor end frame 16 is swung laterally relative to the fixed frame 14. There is also provided within the pushrod 78 apparatus for initially adjusting the tension on the endless chain 32 when the end frame 16 is aligned with the fixed frame 14. The tensioning apparatus and adjusting apparatus is positioned beneath the conveyor frame within the confines of the conveyor frame to provide space along the sides of the conveyor.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. In an endless conveyor the combination comprising:
a fixed frame member;
a laterally swingable end frame member, said laterally swingable end frame member pivotally secured to said fixed frame member about a first vertical pivot axis;
an endless conveyor guided for longitudinal movement along said fixed frame member and said swingable end frame member;
a transversely extending rotatable member slidably mounted on said end frame and movable longitudinally thereon, said endless conveyor reeved about said rotatable member; and
a rod member pivotally secured at one end to said fixed frame member about a second vertical axis at a location spaced from said first pivot axis, said rod member other end portion pivotally secured to said rotatable member to provide a pivot connection between said rod member and said rotatable member, said rod member arranged upon lateral movement of said end frame member to move said rotatable member longitudinally on said end frame member and exert a tension on said endless conveyor.

2. An endless conveyor as set forth in claim 1 in which: said first vertical pivotal axis and said second vertical pivot axis are aligned with the longitudinal axis of said fixed frame member.

3. An endless conveyor as set forth in claim 1 which includes, means to vary the length of said rod member to thereby adjust the tension on said endless conveyor reeved about said rotatable member.

4. An endless conveyor as set forth in claim 1 in which:
said laterally swingable end frame member includes a pair of vertical spaced sidewalls, said sidewalls having a plurality of aligned apertures therethrough; and
a bracket member supporting said rotatable member and having laterally extending portions positioned in said elongated apertures, said bracket member connected to said rod member and operable to move longitudinally relative to said laterally swingable end frame member to exert a tension on said endless conveyor.

6. An endless conveyor as set forth in claim 4 in which said rotatable member includes, a sprocket member axially aligned with the longitudinal axis of said laterally swingable end frame member.

6. An endless conveyor as set forth in claim 4 which includes, drive motors mounted on said bracket member and drivingly connected to said to said rotatable member and movable longitudinally relative to said laterally swingable end frame member.

7. An endless conveyor as set forth in claim 1 in which:
said rod member includes, a front takeup bar portion with a rearwardly extending threaded shaft portion;
a sleeve member having a threaded front end portion threadably secured to said rearwardly extending threaded shaft portion;
said rod member having a connecting portion connected to said rotatable member and having a forwardly extending cylindrical front end portion;
said cylindrical front end portion rotatably positioned in said sleeve member; and
means to nonrotatably secure said sleeve member to said cylindrical front end portion, said sleeve member operable upon rotation to move longitudinally relative to said takeup bar portion to thereby move said rotatable member longitudinally relative to said swingable end frame member and tension said endless conveyor reeved about said rotatable member.

8. An endless conveyor as set forth in claim 1 in which, said rod member is pivotally secured to the bottom wall of said fixed frame beneath said conveyor and within the lateral dimensions of said conveyor.

(. An endless conveyor as set forth in claim 1 which includes, guide means associated with said pushrod and said fixed frame member to guide said pushrod longitudinally as said end frame member moves laterally.